(12) United States Patent
Cho et al.

(10) Patent No.: US 11,861,655 B2
(45) Date of Patent: Jan. 2, 2024

(54) METHOD AND APPARATUS FOR TRACKING CONVERSION OF ADVERTISEMENTS PROVIDED THROUGH APPLICATION

(71) Applicant: KAKAO CORP., Jeju-si (KR)

(72) Inventors: Kyung Pil Cho, Seongnam-si (KR); Seok Young Kim, Seongnam-si (KR); Hwa Kyung Lee, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 17/493,843

(22) Filed: Oct. 5, 2021

(65) Prior Publication Data

US 2022/0108350 A1    Apr. 7, 2022

(30) Foreign Application Priority Data

Oct. 6, 2020    (KR) .................... 10-2020- 0129014

(51) Int. Cl.
*G06Q 30/00* (2023.01)
*G06Q 30/0242* (2023.01)
(Continued)

(52) U.S. Cl.
CPC ..... *G06Q 30/0246* (2013.01); *G06Q 30/0273* (2013.01); *G06Q 30/0277* (2013.01); *H04L 51/04* (2013.01); *H04L 67/535* (2022.05)

(58) Field of Classification Search
None
See application file for complete search history.

(56) References Cited

U.S. PATENT DOCUMENTS

| 2007/0198490 A1* | 8/2007 | Lee | ......................... G06Q 30/02 |
| 2009/0049133 A1* | 2/2009 | Odom | .................... G06Q 10/10 |
| | | | 709/206 |

(Continued)

FOREIGN PATENT DOCUMENTS

| JP | 2014006728 A | 1/2014 |
| JP | 6446107 B1 | 12/2018 |

(Continued)

OTHER PUBLICATIONS

Kitts; Attribution of Conversion Events to Multi-channel Media; IEEE; pp. 881-886; 2010.*

(Continued)

*Primary Examiner* — Radu Andrei
(74) *Attorney, Agent, or Firm* — CANTOR COLBURN LLP

(57) ABSTRACT

A method and apparatus for tracking a conversion of an advertisement provided through an application are disclosed. The method includes generating, in response to selection of an advertisement through a first application installed on a first user terminal, a click log including a first advertiser identifier corresponding to an advertiser of the advertisement and a first user identifier corresponding to the first user terminal, generating, in response to reading of an informational message through a second application installed on a second user terminal, a conversion log including a second advertiser identifier corresponding to a sender of the informational message and a second user identifier corresponding to the second user terminal, and tracking whether a conversion event occurs due to the advertisement by mapping the click log and the conversion log.

17 Claims, 7 Drawing Sheets

(51) Int. Cl.
*G06Q 30/0273* (2023.01)
*H04L 51/04* (2022.01)
*G06Q 30/0241* (2023.01)
*H04L 67/50* (2022.01)

(56) References Cited

U.S. PATENT DOCUMENTS

2015/0073893 A1* 3/2015 Brown ............... G06Q 30/0246
  705/14.45
2022/0239464 A1* 7/2022 Wang .................... H04L 9/3297

FOREIGN PATENT DOCUMENTS

| JP | 2019046318 A | 3/2019 |
| JP | 2020526828 A | 8/2020 |
| KR | 20150000017 A | 1/2015 |
| KR | 20150110602 A | 10/2015 |
| WO | 2019010057 A1 | 1/2019 |

OTHER PUBLICATIONS

Zhao; Revenue-based Attribution Modeling; GroupM; 23 pages; 2012.*

Digital Minoru company "Comment the Messenger advertisement in an easy-to-understand manner," https://ppc-master.jp/labo/2019/01/messenger.html (Retrieved Jul. 14, 2022): 34 pages.

Office Action for Japanese Patent Application; International Application No. 2021-115040; International Filing Date: Jun. 17, 2021 ; dated Sep. 13, 2022; 9 pages.

* cited by examiner

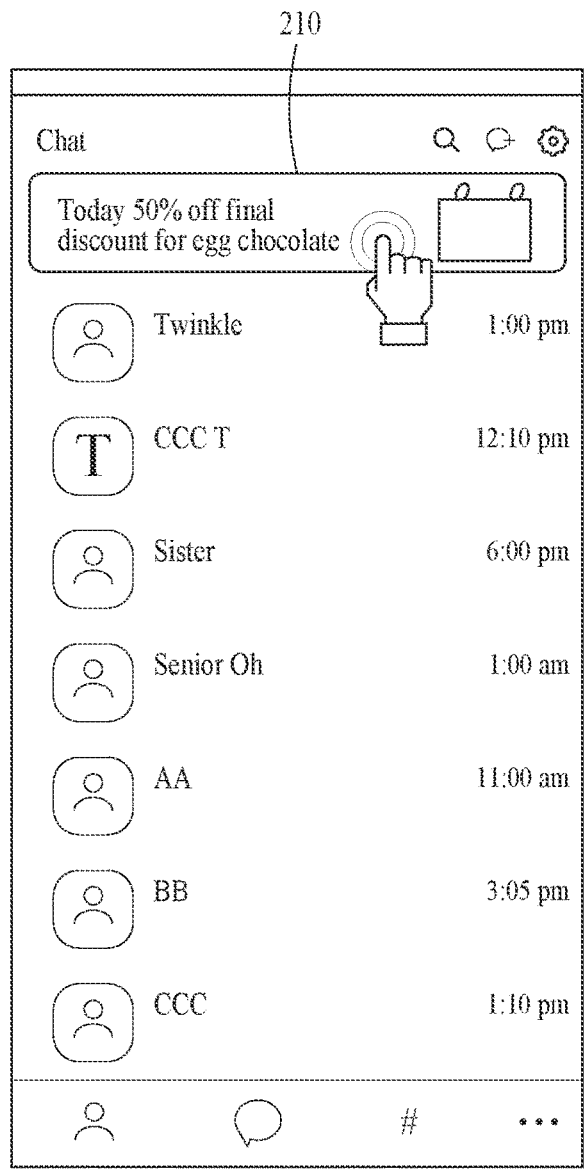
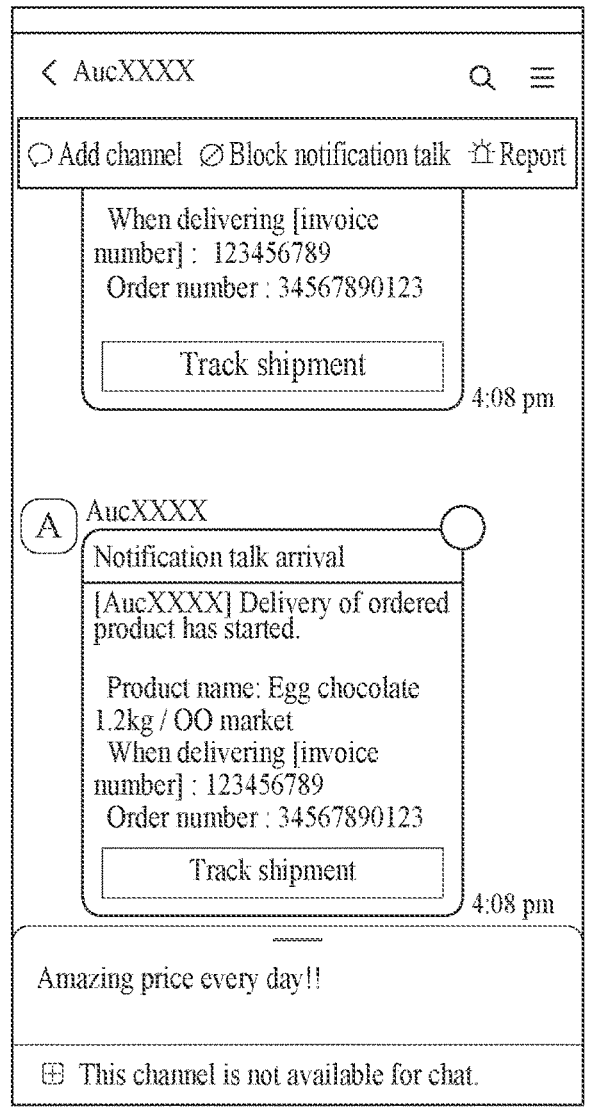
FIG. 2A                    FIG. 2B

| Advertiser identifier | Account |
|---|---|
| A | aa |
| A | ab |
| A | bb |
| B | ac |

FIG. 3

| Advertiser identifier | User identifier |
|---|---|
| A | a |
| A | b |
| B | b |
| B | c |
| B | d |

FIG. 4A

| trackid | clickid | adid | ip |
|---|---|---|---|
| 5535 | 553501 | 42a95-4c8c | 211.291.10.222 |

| Advertiser identifier | User identifier | Event identifier |
|---|---|---|
| A | a | Purchase |
| A | b | Purchase |
| A | c | Membership registration |
| B | b | Membership registration |
| B | d | Purchase |

FIG. 5A

| trackid | adid | event | tag | price | currency | ip |
|---|---|---|---|---|---|---|
| 5535 | 42a95-4c8c | Purchase | | 1,000,000 | KRW | 211.291.10.222 |
| 5535 | a6df1c93-c5cb | CompleteRegistration | | | | 233.294.100.772 |
| 5535 | b098ab-204d | Participation | Coupon | | | 233.294.100.772 |

FIG. 5B

| Advertiser identifier | Template of message | Event identifier |
|---|---|---|
| A | 101 | Purchase |
| A | 102 | Membership registration |
| A | 103 | Participation |
| B | 201 | Purchase |
| B | 202 | Membership registration |

FIG. 6A

| sender id | profile id | trackid | template id | event type | tag |
|---|---|---|---|---|---|
| 1234 | 987 | 5535273539715419072 | 30495 | Purchase | |
| 1234 | 987 | 5535273539715419072 | 30496 | CompleteRegistration | |
| 1234 | 987 | 5535273539715419072 | 30497 | Participation | Coupon |

FIG. 6B

| Advertiser identifier | User identifier |
|---|---|
| A | a |
| A | b |
| B | b |

FIG. 7A

| Advertiser identifier | User identifier | Event identifier | Conversion information |
|---|---|---|---|
| A | a | Purchase | |
| A | b | Purchase | |
| B | b | Membership registration | |

FIG. 7B

| adaccount_id | campaign_id | adgroup_id | trackid | clickid | adid | ip |
|---|---|---|---|---|---|---|
| 183749 | 58738 | 384722 | 55352735397154190072 | 55352735397154190072 | 42a95ce5-49ae-4cBc-Bbf7-53cfb3aa6574 | 211.291.10.222 |

FIG. 7C

| User | Server | Advertiser |
|---|---|---|
|  | Generate advertiser identifier and provide advertisement | Request for advertisement and conversion tracking |
| Click advertisement through application | Obtain click log |  |
| Visit app/webpage of advertiser |  |  |
| Purchase product |  |  |
| Read notification message associated with purchase through application | Obtain conversion log |  |
|  | Map click log and conversion log |  |
|  | Generate conversion information |  |
|  |  | Receive conversion information |

FIG. 8

METHOD AND APPARATUS FOR TRACKING CONVERSION OF ADVERTISEMENTS PROVIDED THROUGH APPLICATION

CROSS-REFERENCE TO RELATED APPLICATION(S)

This application claims the benefit of Korean Patent Application No. 10-2020-0129014, filed on Oct. 6, 2020, in the Korean Intellectual Property Office, the disclosure of which is incorporated herein by reference.

BACKGROUND

1. Field of the Invention

Example embodiments relate to a method and apparatus for tracking a conversion of an advertisement provided through an application.

2. Description of the Related Art

Conversion tracking is to track whether a user performs an intended action in response to marketing, advertising, and the like. The intended action may be defined by an advertiser, and may include, for example, purchase, membership registration, and the like. An advertiser desires to know a conversion rate associated with his/her advertisement being displayed to a user to maximize return on investment (ROI) by reducing a cost of paying for a non-profitable advertisement. In order to track a conversion, a technology may be used to track which advertisement is clicked to result in the conversion by embedding a conversion tracking script into a website of an advertiser, or embedding an SDK in an application of the advertiser. When an advertisement is viewed on an application, and a web page is accessed through a browser other than an in-app browser to result in a conversion such as purchase, or conversely when the advertisement is viewed on the web page, and the conversion such as a purchase occurs through the application, the conversion tracking technology has a short-coming in that conversion tracking is not performed because identifiers of the application and the web page are different from each other.

SUMMARY

Example embodiments provide a technology for tracking a conversion of an advertisement provided through an application by collecting an advertiser identifier assigned to each advertiser and a user identifier assigned to each user's terminal, when a reading action and a conversion action occur.

Example embodiments provide a technology capable of tracking a conversion regardless of a difference between identifiers based on media, even when an advertisement is read through an application and then a webpage or application associated with the advertisement is accessed through another medium.

According to an aspect, there is provided a conversion tracking method including generating, in response to selection of an advertisement through a first application installed on a first user terminal, a click log including a first advertiser identifier corresponding to an advertiser of the advertisement and a first user identifier corresponding to the first user terminal, generating, in response to reading of an informational message through a second application installed on a second user terminal, a conversion log including a second advertiser identifier corresponding to a sender of the informational message and a second user identifier corresponding to the second user terminal, and tracking whether a conversion event occurs due to the advertisement by mapping the click log and the conversion log.

The conversion tracking method may further include receiving, from a service operated by an advertiser corresponding to the second advertiser identifier, a request to send the informational message associated with the conversion event, and sending the informational message to the second user terminal.

The generating of the conversion log may include determining, based on an event identifier corresponding to a message template of the informational message, whether reading of the informational message is a tracking target, and generating, based on the determination, the conversion log including the second advertiser identifier, the second user identifier, and the event identifier.

The conversion tracking method may further include mapping, in response to the advertiser, an advertiser identifier and an account for the second application.

The generating of the conversion log may further include obtaining, based on a result of the mapping, the second advertiser identifier mapped to an account of the sender of the informational message.

The conversion tracking method may further include mapping at least one event identifier associated with a type of interaction between a user interface provided by the advertiser and a user, and at least one message template associated with a type of an informational message sent to a specific account through the second application.

The generating of the conversion log may include obtaining, based on a result of the mapping, the event identifier mapped to the message template of the informational message.

The conversion tracking method may further include providing the advertisement requested by the advertiser to a first user terminal through the first application.

The tracking of whether the conversion event occurs due to the advertisement may further include mapping, based on an advertiser identifier and a user identifier, the click log and the conversion log, and obtaining, based on a result of mapping the click log and the conversion log, conversion information corresponding to the advertiser.

The click log may further include at least one of a click identifier assigned per selection of the advertisement, and time information on a time point when the advertisement is selected.

The conversion log may further include at least one of time information on a time point when the informational message is sent, and time information on a time point when the informational message is read.

The user interface may include a user interface associated with a web page, and a user interface associated with an application.

The conversion tracking method may further include determining, based on a result of the tracking, a charging cost of the advertiser.

The first application and the second application may include a same instant messenger application.

The second application may include an instant messenger application. The first application may include an application different from the instant messenger application. The first application may provide the advertisement in linkage with a messaging server of the instant messenger application.

According to another aspect, there is provided a conversion tracking apparatus including at least one processor configured to generate, in response to selection of an advertisement through a first application installed on a first user terminal, a click log including a first advertiser identifier corresponding to the advertisement and a first user identifier corresponding to the first user terminal, generate, in response to reading of an informational message through a second application installed on a second user terminal, a conversion log including a second advertiser identifier corresponding to a sender of the informational message and a second user identifier corresponding to the second user terminal; and track whether a conversion event occurs due to the advertisement by mapping the click log and the conversion log, and a memory configured to store the click log, the conversion log, and a result of mapping the click log and the conversion log.

The processor may be configured to receive, from a service operated by an advertiser corresponding to the second advertiser identifier, a request to send the informational message associated with the conversion event, and send the informational message to the second user terminal.

The processor may be configured to, in generating the conversion log, determine, based on an event identifier corresponding to a template of the informational message, whether reading of the message is a tracking target, and generate, based on the determination, the conversion log including the second advertiser identifier, the second user identifier, and the event identifier.

The processor may be configured to determine, based on a result of the tracking, a charging cost of the advertiser.

Additional aspects of example embodiments will be set forth in part in the description which follows and, in part, will be apparent from the description, or may be learned by practice of the disclosure.

According to example embodiments, it is possible to secure conversion tracking data even when an identifier of a medium that has read an advertisement and an identifier of a medium where a conversion action has occurred are different from each other.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 2A and 2B are diagrams illustrating a path through which a user identifier is obtained according to an example embodiment;

FIG. 3 is a diagram illustrating a relationship between an advertiser identifier and an account for an application according to an example embodiment:

FIGS. 4A and 4B are diagrams illustrating a click log according to an example embodiment;

FIGS. 5A and 5B are diagrams illustrating a conversion log according to an example embodiment:

FIGS. 6A and 6B are diagrams illustrating a relationship between a message template and an event identifier according to an example embodiment; and FIGS. 7A to 7C are diagrams illustrating an example in which a click log and a conversion log are mapped based on an advertiser identifier and a user identifier according to an example embodiment; and FIG. 8 is a diagram illustrating a scenario of conversion tracking according to an example embodiment.

DETAILED DESCRIPTION

Figure 1:
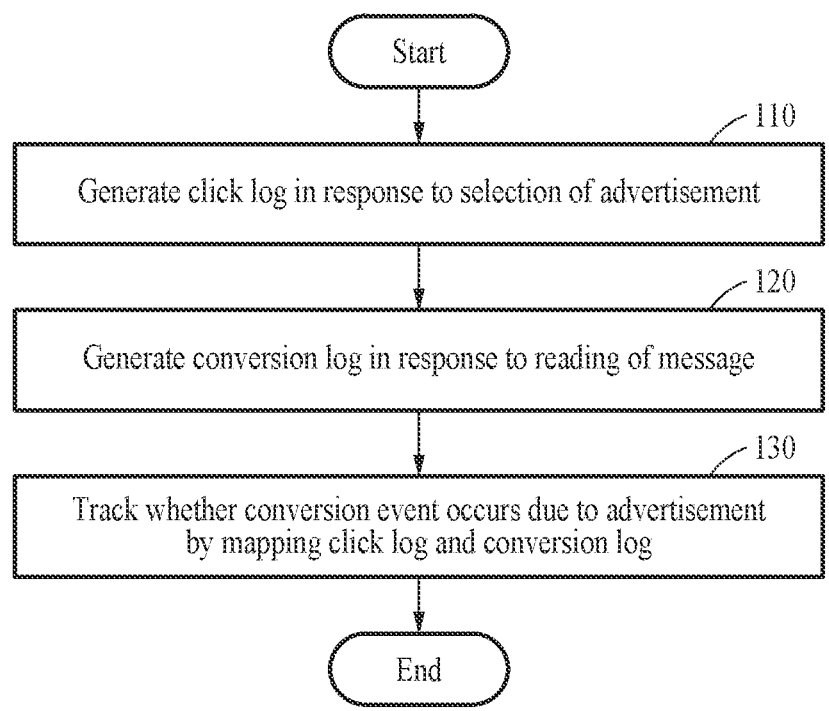
FIG. 1 is a diagram illustrating a flowchart of a conversion tracking method according to an example embodiment.

Hereinafter, example embodiments will be described in detail with reference to the accompanying drawings. The scope of the right, however, should not be construed as limited to the example embodiments set forth herein. Various modifications may be made to the example embodiments. Here, examples are not construed as limited to the example embodiments and should be understood to include all changes, equivalents, and replacements within the idea and the technical scope of the example embodiments.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by those skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the components in the drawings, it should be noted that the same components will be designated by the same reference numerals, wherever possible, even though they are shown in different drawings. Also, in the description of example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

FIG. 1 is a diagram illustrating a flowchart of a conversion tracking method according to an example embodiment.

Conversion tracking according to an example embodiment may be to track, in response to an advertisement provided by an advertiser, whether a user performs an action intended by the advertisement. The action intended by the advertisement may be defined by the advertiser, and may represent an action that the advertiser expects the user to perform through the advertisement, and may include, for example, actions such as purchase, membership registration, and the like. Hereinafter, the action intended by the advertisement that is performed in response to the advertisement provided by the advertiser may be referred to as a conversion event or an event.

Referring to FIG. 1, the conversion tracking method according to an example embodiment may include generating a click log in response to selection of an advertisement (operation 110), generating a conversion log in response to reading of an informational message (operation 120), and tracking whether a conversion event occurs due to the advertisement by mapping the click log and the conversion log (operation 130). The conversion tracking method according to an example embodiment may be performed by a server associated with an application. An application according to an example embodiment may include a first application through which an advertisement is provided and a second application through which an informational message is provided. A server according to an example embodiment may provide an advertisement based on a request of an advertiser to a user through the first application. A second application according to an example embodiment may include a message transmission/reception function, and a user may use the message transmission/reception function through the second application with an account for the second application. According to an example embodiment, a message sent through the second application may include an informational message, and the informational message may be distinguished from a general message, and a server associated with the second application may be requested to send the informational message through a specific account. That is, the server according to an example embodiment may receive, from a service operated by the advertiser, a request to send an informational message associated with a specific event, and may send the informational message to a terminal of the user. Here, the advertiser may be an advertiser corresponding to an account that has sent the informational message. The first application and the second application according to an example embodiment may be distinguished from an application serviced by the advertiser.

The second application according to an example embodiment may include an instant messenger application. The first application according to an example embodiment may include an application that provides an advertisement in linkage with a server of the second application. According to an example embodiment, the first application and the second application may be the same application. For example, when the second application according to an example embodiment is an instant messenger application, the first application may be the same instant messenger application as the second application, or may include an application different from the second application that provides an advertisement in linkage with a messaging server of the second application.

The generating of the click log (operation 110) according to an example embodiment may include generating, by a server, in response to selection of an advertisement through a first application installed on a first user terminal, a click log including a first advertiser identifier corresponding to an advertiser of the advertisement and a first user identifier corresponding to the first user terminal. Selection of an advertisement according to an example embodiment may include an action of clicking an advertisement provided through a user interface of the first application.

An advertiser identifier according to an example embodiment may be an identifier that is uniquely assigned to each advertiser in response to a conversion tracking request of an advertiser. For example, an advertiser identifier "A" may be generated to correspond to a first advertiser, and an advertiser identifier "B" may be generated to correspond to a second advertiser, and advertiser identifiers generated to correspond to different advertisers may be distinguished from each other. Hereinafter, the advertiser identifier may be indicated as "trackid".

A user identifier according to an example embodiment may be an identifier that is uniquely assigned to each terminal by an operating system of a terminal of a user, and may include, for example, "adid" assigned to the user's terminal in an Android operating system. More specifically, a user identifier "aa" may be generated to correspond to a terminal of a first user, and a user identifier "ab" may be generated to correspond to a terminal of a second user, and user identifiers generated to correspond to terminals of different users may be distinguished from each other.

According to an example embodiment, the user identifier may be collected when a user's terminal selects an advertisement provided through the first application or when the user's terminal reads an informational message provided through the second application. As described above, the first application and the second application may be the same or different from each other. Referring to FIG. 2A, when the user's terminal selects an advertisement 210 through the first application, the server may obtain a user identifier corresponding to the user's terminal in response to selection of the advertisement. Referring to FIG. 2B, when the user's terminal reads an informational message sent from a specific account through the second application and received by the user's account, the server may obtain a user identifier corresponding to the user's terminal in response to reading of the informational message. According to an example embodiment, reading an informational message may be distinguished from receiving an informational message, and may represent that a user checks an informational message received by the user's account. That is, when the user checks a content of an informational message received through the second application, it may be determined that the informational message has been read. When an informational message is read by the user's terminal, the server according to an example embodiment may obtain information on the informational message. According to an example embodiment, an informational message sent from a specific account through the second application may include an informational message for providing specific information to a recipient, and the specific account may include an account capable of sending an informational message. A method for obtaining a user identifier according to an example embodiment is described in detail below.

The conversion tracking method according to an example embodiment may further include, prior to generating a click log, generating an advertiser identifier for conversion tracking, and mapping the advertiser identifier and an account for the second application. The advertiser identifier according to an example embodiment may be generated, based on a conversion tracking request of a specific advertiser, to correspond to the advertiser. An account for the second application according to an example embodiment may be a unique identifier assigned to a user through a subscription procedure in the second application and the like so as to identify a sender of a message through the second application, and may include, for example, an account capable of sending a general message through the second application, an account capable of sending an informational message through the second application, and an account capable of sending an advertisement message through the second application. According to an example embodiment, other types of messages such as a general message, an informational message, and an advertisement message may be sent from the same account for the second application.

There may be one or a plurality of accounts for the second application corresponding to the advertiser identifier according to an example embodiment. That is, according to an example embodiment, the advertiser identifier may be mapped to one or more account(s) for second applications. For example, referring to FIG. 3, there may be three accounts "aa", "ab", and "bb" for the second application mapped to the advertiser identifier "A", and there may be one account "ac" for the second application mapped to the advertiser identifier "B". Although described in detail below, when generating a conversion log, based on a result of mapping the advertiser identifier and the account for the second application, obtaining an advertiser identifier corresponding to an account that has sent an informational message may be included.

According to an example embodiment, in response to an advertisement being selected by each of terminals of a plurality of users, a plurality of click logs may be generated to correspond to each user's terminal and an advertiser of an advertisement selected by each user's terminal. A plurality of click logs generated by the server may be stored to have a data structure such as a table format in the server, and managed by the server.

FIGS. 4A and 4B are diagrams illustrating a click log according to an example embodiment.

Referring to FIG. 4A, the click log according to an example embodiment may include an advertiser identifier and a user identifier. That is, the server according to an example embodiment may generate, in response to a user's advertisement selection, a click log including an advertiser identifier corresponding to an advertiser of an advertisement selected by the user and a user identifier corresponding to a terminal of the user.

Referring to FIG. 4B, the click log according to an example embodiment may further include a click identifier (clickid), an Internet protocol address (ip) of a user terminal, and the like, in addition to an advertiser identifier (trackid) and a user identifier (adid).

According to an example embodiment, the click log may further include at least one of a click identifier assigned per selection of an advertisement and time information on an advertisement click time point. The click identifier according to an example embodiment may be an identifier assigned per selection of an advertisement, and even when the same user selects the same advertisement, the click identifier may be assigned differently depending on a selection time point. That is, when the same user selects the same advertisement tice, a click identifier generated to correspond to a first selection and a click identifier generated to correspond to a second selection may be different from each other, and two click logs including different click identifiers respectively corresponding to two advertisement selections may be generated.

According to an example embodiment, the click log may include time information on a selection time point. That is, when the user selects an advertisement provided through the first application, a click log including the time information on a selection time point may be generated together with the user identifier and the advertiser identifier. For example, the time information may include a date (year, month, day) and time (hour, minute, second).

The click log according to an example embodiment may include time information on a click identifier or a selection time point, and thus the server may obtain information on an advertisement selection time point. Although described in detail below, the time information on an advertisement selection time point may be used to generate conversion information such as determining a conversion type.

Referring back to FIG. 1, the generating of the conversion log (operation 120) according to an example embodiment may be generating, in response to reading of an informational message through a second application installed on a second user terminal, a conversion log including a second advertiser identifier corresponding to a sender of the informational message and a second user identifier corresponding to the second user terminal. The conversion tracking method according to an example embodiment may further include receiving, from a service operated by an advertiser corresponding to identification of a second advertiser, a request to send an informational message associated with an event, and sending the informational message to the second user terminal. A first user terminal and a second user terminal according to an example embodiment may be the same or different from each other. In addition, a first advertiser identifier and a second advertiser identifier according to an example embodiment may be the same or different from each other.

FIGS. 5A and 5B are diagrams illustrating a conversion log according to an example embodiment.

Referring to FIG. 5A, the conversion log according to an example embodiment may include a sender of an informational message, that is, an advertiser identifier corresponding to an account that has sent the informational message, a user identifier corresponding to a terminal of a user, and an event identifier. As described above, the advertiser identifier may be mapped to one or more account(s) for the second application. When generating the conversion log, obtaining, based on a result of mapping the advertiser identifier and the account for the second application, an advertiser identifier corresponding to the account that has sent the informational message may be included. Information on the account that has sent the informational message according to an example embodiment may be managed by the server together with informational message transmission information. For example, when the account that has sent the informational message is "aa", the server may obtain the advertiser identifier "A" mapped to the account "aa", based on the mapping information illustrated in FIG. 3. An event generator and a method for obtaining the event generator according to an example embodiment are described in detail below.

According to an example embodiment, the conversion log may further include at least one of time information on a time point when an informational message is sent and time information on a time point when an informational message is read. The conversion log according to an example embodiment may include the time information on a time point when an informational message is sent or the time information on when an informational message is read, and thus the server may obtain information on a time point when a conversion associated with an advertisement occurs. Although described in detail below, the information on a time point when a conversion occurs may be used to generate conversion information such as determining a conversion type.

Referring to FIG. 5B, the conversion log according to an example embodiment may further include information that is obtainable through an informational message such as a price, a currency, an ip, or the like, in addition to the advertiser identifier (trackid), the user identifier (adid), and an event identifier (an event and a tag). For example, when a user purchases a product through a shopping mall web page of an advertiser, an informational message on the purchase may be sent to the user's account through the second application. In response to the informational message being read by the user, a conversion log including information on a purchase amount and a currency may be generated.

An event identifier according to an example embodiment may be an identifier of a conversion event assigned depending on a type of interaction between a user interface provided by an advertiser and a user, and may include, for example, an event identifier of "membership registration" that is assigned when a user registers for a membership through an app or web provided by an advertiser, and an event identifier of "purchase" that is assigned when the user purchases a product. According to an example embodiment, the event identifier may include a plurality of categories in order to specifically classify the interaction type. For example, the event identifier may include an event type category and a tag category of FIG. 6B.

The event identifier according to an example embodiment may be obtained based on a message template. A message template according to an example embodiment may be an identifier assigned depending on a format of an informational message transmitted and received to through the second application. For example, when an advertiser desires to send an informational message associated with purchase through the second application, the message template may use an informational message format associated with purchase including purchase details and the like, and may include a message template of "purchase" assigned to the informational message format associated with purchase. The generating of the conversion log (operation 120) according to an example embodiment may further include mapping at least one event identifier and at least one message template associated with a type of an informational message sent to a specific account through the second application.

Referring to FIG. 6A, an advertiser identifier may be mapped to message template(s) based on the informational message format sent through the second application, and each message template may be mapped to an event identifier. For example, the advertiser identifier "A" of FIG. 6A may be mapped to two message templates 101 and 102, and the message template 101 may be mapped to the event identifier of "purchase", and the message template 102 may be mapped to the event identifier of "membership registration". That is, the message template 101 may be an identifier assigned to a format of an informational message for notifying a user of information on purchase such as purchase details, and the message template 102 may be an identifier assigned to a format of an informational message for notifying a user of information on membership registration such as membership registration details. FIG. 6A illustrates an example in which different message templates are assigned to correspond to different advertiser identifiers. However, according to an example embodiment, the same message template may be assigned to correspond to different advertiser identifiers. In this case, an event identifier mapped to the same message template may be determined differently for each advertiser identifier. For example, the message template "101" corresponding to the advertiser identifier "A" may be mapped to the event identifier of "purchase", and the message template "101" corresponding to the advertiser identifier "B" may be mapped to the event identifier of "membership registration".

Referring to FIG. 6B, the event identifier according to an example embodiment may include an event type category and a tag category, and the event identifier may be determined as an identifier corresponding to each category. For example, when the event type is Purchase and CompleteRegistration, an identifier based on the tag category may not be included. However, when the event type is Participation, the event identifier may be determined by an identifier such as a coupon based on the tag category. That is, when tags are different from each other although event types are the same, event identifiers may be different from each other.

Referring to FIG. 6B, a message template and an event identifier mapped to the message template may be determined based on the advertiser identifier (trackid) and an account (sender id and profile id) for the second application. As described above, there may be a plurality of accounts for the second application corresponding to the same advertiser identifier. For example, an identifier of an account for the second application may include "sender id" and "profile id", and there may be one or more "sender id" and/or one or more "profile id" corresponding to the same advertiser identifier. Mapping of the message template and the event identifier according to an example embodiment may be determined depending on the account for the second application corresponding to the advertiser identifier. For example, different message templates and event identifiers may be mapped depending on the account for the second application of the same advertiser identifier.

When generating the conversion log, obtaining, based on a result of mapping the event identifier and the message template, an event identifier corresponding to a message template of an informational message read by the second user terminal through the second application may be included. Information on a message template of an informational message according to an example embodiment may be managed by the server together with informational message transmission information. For example, when a message template of a transmitted informational message is "101", the server may obtain the event identifier "purchase" mapped to the message template "101", based on the mapping information illustrated in FIG. 6A.

Referring back to FIG. 1, the generating of the conversion log (operation 120) according to an example embodiment may include determining, in response to reading of an informational message sent to a user through the second application, whether the user's informational message reading is a tracking target, based on an event identifier corresponding to a message template of the informational message, and generating a conversion log including a second advertiser identifier, a second user identifier, and an event identifier, when it is determined as a tracking target. Whether the user's informational message reading is a tracking target may be determined by the event identifier corresponding to the message template of the informational message. In other words, when the event identifier corresponding to the message template of the informational message is a preset tracking target event identifier, reading of the informational message may be determined as a tracking target. In addition, based on whether a sender of the informational message is an advertiser who requests conversion tracking from the server according to an example embodiment, whether the user's informational message reading is a tracking target may be determined. A tracking target event identifier according to an example embodiment may be determined by a conversion tracking request of an advertiser, and may be an event that is set as a tracking target by the advertiser so as to track a conversion caused by an advertisement. According to an example embodiment, based on an event identifier, when it is determined that reading of an informational message is a tracking target, a conversion log including an advertiser identifier, a user identifier, and an event identifier corresponding to the informational message may be generated. For example, when only the event identifier of "purchase" is a tracking target event identifier, and a message template of an informational message read by a user is the event identifier of "purchase", a conversion log may be generated by the server in response to reading of the informational message. Conversely, when the message template of the informational message read by the user is the event identifier of "membership registration", a conversion log associated with reading of the informational message may not be generated.

According to an example embodiment, the generating of the conversion log (operation 120) may include generating, in response to reading of an informational message through the second application installed on the second user terminal, a conversion log including a second advertiser identifier corresponding to a sender of the informational message, a second user identifier corresponding to the second user terminal, and an event identifier corresponding to a message template of the informational message. That is, in a conversion log generation operation, regardless of an event identifier, a conversion log may be obtained in response to reading of an informational message, and the event identifier may be considered in an operation of mapping a click log and the conversion log. In other words, in mapping a click log and a conversion log, the conversion log may be mapped to the click log, based on whether to include an event identifier that is a tracking target. For example, when only the event identifier of "purchase" is a tracking target event identifier, and a conversion log includes the event identifier of "purchase", the conversion log may be mapped to a click log. Conversely, when a conversion log includes the event identifier of "membership registration", the conversion log may not be mapped to a click log.

The tracking of whether the conversion event occurs due to the advertisement by mapping the click log and the conversion log (operation 130) may include mapping, based on an advertiser identifier and a user identifier, a click log and a conversion log. In other words, an operation of mapping a click log and a conversion log having the same advertiser identifier and user identifier may be included. According to an example embodiment, based on a result of mapping the conversion log and the click log, it is possible to track whether a conversion event occurs due to an advertisement. For example, when the click log and the conversion log are mapped, it may be determined that a user exposed to an advertisement has taken an action for which the advertiser requested conversion tracking due to the advertisement, and thus it may be determined that a conversion event has occurred due to the advertisement.

FIGS. 7A to 7C are diagrams illustrating an example in which a click log and a conversion log are mapped, based on an advertiser identifier and a user identifier according to an example embodiment.

More specifically, FIG. 7A is a diagram illustrating a result of mapping the click log illustrated in FIG. 4A and the conversion log illustrated in FIG. 5A, based on the advertiser identifier and the user identifier. Referring to FIGS. 4A and 5A, the advertiser identifier "A" and a user identifier "a" may be included in both the click log and the conversion log. Conversely, the advertiser identifier "B" and a user identifier "c" may be included in the click log only, and the advertiser identifier "B" and a user identifier "d" may be included in the conversion log only. Therefore, referring to the mapping result of FIG. 7A, the advertiser identifier "A" and the user identifier "a" included in both the click log and the conversion log may be included in the mapping result, and the advertiser identifier "B" and the user identifier "c" included in the click log only, the advertiser identifier "B", and the user identifier "d" included in the conversion log only may not be included in the mapping result because no mapping between the conversion log and the click log occurs.

Referring to FIG. 7B, a mapping result according to an example embodiment may include a user identifier, an advertiser identifier, and an event identifier. In addition, conversion information may be further included. Conversion information according to an example embodiment may include information on a conversion generated based on information included in a click log and a conversion log.

The conversion information according to an example embodiment may include information on a conversion type obtained based on information on a click time point included in the click log and information on a conversion time point included in the conversion log. More specifically, the conversion type may be classified as an indirect conversion or a direct conversion depending on a time difference between the information on a click time point and the information on a conversion time point. For example, when a time period required to perform a purchase action after clicking an advertisement is within a day, the conversion type may be classified as the direct conversion, and when the time period is within a month, the conversion type may be classified as the indirect conversion. In this case, based on the information on a click time point and the information on a conversion time point, information classified as the indirect conversion or the direct conversion may be included in the conversion information.

In addition, according to an example embodiment, the conversion information may include information on the number of mapping results corresponding to an advertiser identifier, that is, information on the number of mapped conversion logs and click logs corresponding to the same advertiser identifier, and information on a conversion rate calculated based on the number of click logs corresponding to the advertiser identifier and the number of mapping results corresponding to the advertiser identifier. The conversion rate may represent a rate at which reading of an advertisement leads to an action induced by the advertisement, and may be calculated as a rate of consumers who accesses a website/app of an advertiser and performs an action induced by a specific advertisement among consumers who has read the specific advertisement. The number of consumers who has read the specific advertisement may be predicted by the number of click logs corresponding to the advertiser identifier according to an example embodiment. Among the consumers who has read the specific advertisement, the number of consumers who performs an action induced by the advertisement may be predicted by the number of mapped click logs and conversion logs corresponding to the advertiser identifier, and thus the conversion rate may be calculated based thereon. For example, when the number of click logs corresponding to the advertiser identifier "A" is 100, and the number of results of mapping conversion logs and click logs corresponding to the advertiser identifier "A" is 60, the conversion rate may be calculated as 60% to be included in the conversion information.

Referring to FIG. 7C, information (adaccount_id, campaign_id, and adgroup_id) may be further included in the mapping result according to an example embodiment.

FIG. 8 is a diagram illustrating a scenario of conversion tracking according to an example embodiment. More specifically, FIG. 8 illustrates an example in which an operation for tracking a conversion is performed by a server by an interaction between an advertiser and a user.

Referring to FIG. 8, when there are a request for generating an advertisement and a request for tracking a conversion for the advertisement from an advertiser, an application server according to an example embodiment may generate an advertiser identifier, and may provide the advertisement of the advertiser corresponding to the advertiser identifier through the first application. A user may receive the advertisement through the first application installed on a terminal of the user, and may click the advertisement through the first application to access a user interface associated with a service operated by the advertiser, such as a web page or application of the advertiser. The server according to an example embodiment may generate a click log in response to the user's advertisement click. As described above, the click log according to an example embodiment may include an advertiser identifier corresponding to the advertisement and a user identifier corresponding to the user's terminal. The user may access the user interface provided by the advertiser by clicking the advertisement through the first application. The user interface connected to the advertisement click may include an application of the advertiser, a website of the advertiser, and a website of the advertiser provided through an in-app browser. In addition, separately from the user interface connected through the advertisement click, the user may visit the advertiser's website or application corresponding to the advertisement via a network. The user may perform an action of completing registration, purchasing a product, and the like through the advertiser's website or application. The advertiser's website or application may preset so that an informational message is sent to the user through the second application according to an example embodiment in response to the user's action. The user may read the informational message sent by the advertiser through the second application. The server according to an example embodiment may generate a conversion log in response to the user's informational message reading. The server according to an example embodiment may map the generated click log and conversion log, based on the advertiser identifier and the user identifier. Mapping according to an example embodiment may be performed based on a preset criterion, such as being performed at a predetermined cycle. The server according to an example embodiment may generate conversion information based on a mapping result, and may provide, to the advertiser, a mapping result and conversion information generated to correspond to the advertiser identifier. In addition, the conversion tracking method according to an example embodiment may further include determining, based on a tracking result based on mapping of the click log and the conversion log, a charging cost for the advertisement of the advertiser. For example, the conversion tracking method according to an example embodiment may further include determining a charging cost for the advertisement in proportion to a conversion rate calculated based on a result of mapping the click log and the conversion log.

The conversion tracking method according to an example embodiment may be performed by at least one processor, and a result of mapping a generated click log, conversion log, a result of mapping the click log and the conversion log, and conversion information generated based on the mapping result may be stored in a memory. That is, a conversion tracking apparatus according to an example embodiment may include at least one processor configured to perform the above-described conversion tracking method, and a memory configured to store a generated click log, conversion log, a result of mapping the click log and the conversion log, and conversion information generated based on the mapping result. The conversion tracking apparatus according to an example embodiment may include a server, and the server according to an example embodiment may include a messaging server associated with transmission and reception of a message.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure

What is claimed is:

1. A conversion tracking method comprising:
generating, by a processor, in response to selection of an advertisement of an advertiser through a first application installed on a first user terminal, a click log comprising a first advertiser identifier of the advertiser and a first user identifier corresponding to the first user terminal;
generating, by the processor, in response to reading of an informational message through a second application installed on a second user terminal, a conversion log comprising a second advertiser identifier corresponding to a sender of the informational message and a second user identifier corresponding to the second user terminal, wherein the conversion log further comprises information obtained from the informational message, the information comprising at least one of:
a price, the second advertiser identifier, the second user identifier, and an event identifier;
a currency, the second advertiser identifier, the second user identifier, and an event identifier; and
an internet protocol address, the second advertiser identifier, the second user identifier, and an event identifier;
tracking, by the processor, whether a conversion event occurs due to the advertisement by mapping the click log and the conversion log, wherein mapping the click log and the conversion log comprises:
determining that the first advertiser identifier in the click log and the second advertiser identifier in the conversion log indicate a same advertiser;
determining that the first user identifier in the click log and the second user identifier in the conversion log indicate a same user; and
generating a pair of the click log and the conversion log based on a determination that the first advertiser identifier and the second advertiser indicate the same advertiser and a determination that the first user identifier and the second user indicate the same user;
wherein tracking whether the conversion event occurs due to the advertisement comprises:
generating conversion information based on information included in the pair of the click log and the conversion log; and
obtaining, based on a result of mapping the click log and the conversion log, conversion information corresponding to the advertiser;
wherein a result of mapping the click log and the conversion log comprises information on a conversion type obtained based on information on a click time point included in the click log and information on a conversion time point included in the conversion log, wherein the conversion type comprises one of a direct conversion type or an indirect conversion type determined according to an elapsed amount of time between the click time point and the conversion time point, wherein, when an elapsed amount of time between the click time point and the conversion time point is within a first period, the conversion type is classified as a direct conversion type, and wherein, when the elapsed amount of time between the click time point and the conversion time point is after the first period and within a second period longer than the first period, the conversion type is classified as an indirect conversion type;
wherein the second application comprises an instant messenger application and the first application comprises an application different from the instant messenger application; and
wherein the first application provides the advertisement in linkage with a messaging server of the second application.

2. The conversion tracking method of claim 1, further comprising:
receiving, from a service operated by an advertiser corresponding to the second advertiser identifier, a request to send the informational message associated with the conversion event; and
sending the informational message to the second user terminal.

3. The conversion tracking method of claim 1, wherein the generating of the conversion log comprises:
determining, based on an event identifier corresponding to a message template of the informational message, whether reading of the informational message is a tracking target; and
generating, based on the determination, the conversion log comprising the second advertiser identifier, the second user identifier, and the event identifier.

4. The conversion tracking method of claim 1, further comprising:
mapping, in response to the advertiser, an advertiser identifier and an account for the second application.

5. The conversion tracking method of claim 4, wherein the generating of the conversion log further comprises obtaining, based on a result of the mapping, the second advertiser identifier mapped to an account of the sender of the informational message.

6. The conversion tracking method of claim 1, further comprising:
mapping at least one event identifier associated with a type of interaction between a user interface provided by an advertiser and a user, and at least one message template associated with a type of an informational message sent through the second application.

7. The conversion tracking method of claim 6, wherein the generating of the conversion log comprises obtaining, based on a result of the mapping, the event identifier mapped to the message template of the informational message.

8. The conversion tracking method of claim 1, further comprising:
providing the advertisement requested by the advertiser to the first user terminal through the first application.

9. The conversion tracking method of claim 1, wherein the click log further comprises at least one of:
a click identifier assigned per selection of the advertisement; and
time information on a time point when the advertisement is selected.

10. The conversion tracking method of claim 1, wherein the conversion log further comprises at least one of:
time information on a time point when the informational message is sent; and
time information on a time point when the informational message is read.

11. The conversion tracking method of claim 6, wherein the user interface comprises:
a user interface associated with a web page; and
a user interface associated with an application.

12. The conversion tracking method of claim 1, further comprising:
determining, based on a result of the tracking, a charging cost of the advertiser.

13. A non-transitory computer-readable medium storing computer-readable instruction that, when executed by the processor, cause the processor to perform the method of claim 1.

14. A conversion tracking apparatus comprising:
at least one processor, the processor configured to:
generate, in response to selection of an advertisement of an advertiser through a first application installed on a first user terminal, a click log comprising a first advertiser identifier of the advertiser and a first user identifier corresponding to the first user terminal;
generate, in response to reading of an informational message through a second application installed on a second user terminal, a conversion log comprising a second advertiser identifier corresponding to a sender of the informational message and a second user identifier corresponding to the second user terminal, wherein the conversion log further comprises information obtained from the informational message, the information comprising at least one of:
a price, the second advertiser identifier, the second user identifier, and an event identifier;
a currency, the second advertiser identifier, the second user identifier, and an event identifier; and
an internet protocol address, the second advertiser identifier, the second user identifier, and an event identifier;
track whether a conversion event occurs due to the advertisement by mapping the click log and the conversion log, wherein mapping the click log and the conversion log comprises:
determining that the first advertiser identifier in the click log and the second advertiser identifier in the conversion log indicate a same advertiser;
determining that the first user identifier in the click log and the second user identifier in the conversion log indicate a same user; and
generating a pair of the click log and the conversion log based on a determination that the first advertiser identifier and the second advertiser indicate the same advertiser and a determination that the first user identifier and the second user indicate the same user;
wherein tracking whether the conversion event occurs due to the advertisement comprises:
generating conversion information based on information included in the pair of the click log and the conversion log; and
obtaining, based on a result of mapping the click log and the conversion log, conversion information corresponding to the advertiser;
wherein a result of mapping the click log and the conversion log comprises information on a conversion type obtained based on information on a click time point included in the click log and information on a conversion time point included in the conversion log, wherein the conversion type comprises one of a direct conversion type or an indirect conversion type determined according to an elapsed amount of time between the click time point and the conversion time point, wherein, when an elapsed amount of time between the click time point and the conversion time point is within a first period, the conversion type is classified as a direct conversion type, and wherein, when the elapsed amount of time between the click time point and the conversion time point is after the first period and within a second period longer than the first period, the conversion type is classified as an indirect conversion type;
a memory configured to store the click log, the conversion log, and a result of mapping the click log and the conversion log;
wherein the second application comprises an instant messenger application and the first application comprises an application different from the instant messenger application; and
wherein the first application provides the advertisement in linkage with a messaging server of the second application.

15. The conversion tracking apparatus of claim 14, wherein the processor is configured to:
receive, from a service operated by an advertiser corresponding to the second advertiser identifier, a request to send the informational message associated with the conversion event; and
send the informational message to the second user terminal.

16. The conversion tracking apparatus of claim 14, wherein the processor is configured to:
in generating the conversion log, determine, based on an event identifier corresponding to a template of the informational message, whether reading of the message is a tracking target; and
generate, based on the determination, the conversion log comprising the second advertiser identifier, the second user identifier, and the event identifier.

17. The conversion tracking apparatus of claim 14, wherein the processor is configured to determine, based on a result of the tracking, a charging cost of the advertiser.

* * * * *